United States Patent
Stracke, Jr.

[11] Patent Number: 6,167,451
[45] Date of Patent: Dec. 26, 2000

[54] MULTIPLE PUSH PROTOCOL UNIFYING SYSTEM

[75] Inventor: John Richard Stracke, Jr., Santa Clara, Calif.

[73] Assignee: Netscape Communications Corporation, Mountain View, Calif.

[21] Appl. No.: 09/009,619

[22] Filed: Jan. 20, 1998

[51] Int. Cl.$^7$ .................................................. G06F 15/177
[52] U.S. Cl. ........................ 709/230; 709/231; 370/465
[58] Field of Search ................................ 709/230–231, 709/218, 227–229; 370/465

[56] References Cited

U.S. PATENT DOCUMENTS

| | | | |
|---|---|---|---|
| 5,774,660 | 6/1998 | Brendel et al. | 709/201 |
| 5,790,790 | 8/1998 | Smith et al. | 709/206 |
| 5,790,793 | 8/1998 | Higley | 709/218 |
| 5,838,682 | 11/1998 | Dekelbaum et al. | 370/401 |
| 5,862,330 | 7/1999 | Anupam et al. | 709/204 |
| 5,873,077 | 2/1999 | Kanoh et al. | 707/3 |
| 5,893,091 | 4/1999 | Hunt et al. . | |
| 5,918,020 | 6/1999 | Blackard et al. | 709/228 |
| 5,951,643 | 9/1999 | Shelton et al. | 709/227 |

*Primary Examiner*—Zarni Maung
*Assistant Examiner*—Thu Ha Nguyen
*Attorney, Agent, or Firm*—Michael A. Glenn

[57] ABSTRACT

A unifying push framework in a computer network environment uses a plumbing approach wherein a "pipe" (producer) is created to interpret a specified push protocol. Push Universal Resource Locators (PURLs) (the streams) are delivered from a server across the computer network to each pipe that handles the specific protocol which interprets the protocol and delivers the stream to the subscribing client (consumer). Several pipes can be combined and clients can subscribe to several different protocols. These pipes are capable of delivering streams to multiple clients and are created dynamically as each client subscribes to different protocols. Filters are easily added and removed dynamically to or from the system to filter streams. A filter can be added to the output side of a pipe before distribution to the clients and/or added before the client to filter the incoming stream, allowing for a flexible system with multiple filtering schemes.

22 Claims, 6 Drawing Sheets

MULTIPLE PUSH PROTOCOL UNIFYING SYSTEM

BACKGROUND OF THE INVENTION

1. Technical Field

The invention relates to push technology as used in connection with computer networks. More particularly, the invention relates to the interpretation and handling of multiple push protocols as used with a computer network and efficient distribution of the resulting information to a client.

2. Description of the Prior Art

Push technology distributes information that constantly or periodically changes, such as stock market quotes, to clients via computer networks. Referring to FIG. 1, push technology first generation products require the clients 101, 102, 103, and 104 to poll the server 105 constantly with requests for any information changes 106. Unfortunately, the constant polling floods the servers.

With respect to FIG. 2, true push technology occurs when the server 201, rather than the clients 203, 204, 205, and 206, initiates the event. The server 201 pushes out a message 202 to all of the clients 203, 204, 205, and 206 which tells them that this is the new content. This approach is much more efficient than the previous method because there is only traffic across the network when something has actually changed, i.e. when an update is required.

Many different protocols are used in the push arena. Thus, there is a need to subscribe to multiple protocols because of the lack of a standardized protocol. This presents a problem because it is unknown which of the protocols are the proper protocols to choose. Vendors must protect themselves against selecting the wrong protocols and also against the need to replicate the interpretation software every time a protocol is added or deleted. Most vendors simply select one protocol because they do not have a solution to this problem.

One multi-protocol approach specifies the Universal Resource Locators (URL) of items that make up a pushed channel and can be extended to include URLs of items that are delivered via push. However, this approach is only useful for pushed channels and it is not applicable to other types of pushed content, such as notification (also referred to as instant messaging). Additionally, this approach defines a URL for each item pushed, therefore it is not possible to have a pushed channel with a dynamic structure. Rather every item must be previously planned for and identified in a definition file. Finally, this approach defines pushed content with the same namespace (URLS) as pulled content, which is a poor design. A URL is not meant to refer to a stream of content, it properly refers to one item.

It would be advantageous to provide a unifying push framework system that handles and interprets multiple push protocols and distributes information to clients. It would further be advantageous to provide a unifying push framework system that is easily configured and adapted to protocol changes and additions/deletions.

SUMMARY OF THE INVENTION

The invention provides a unifying push framework system. The invention uses an easily configured push framework that allows a system to adjust dynamically to different push protocols that are delivered from a server to a client in a computer network environment. In addition, the invention utilizes a multiprotocol unifying system that enables the client to subscribe to several different push protocols without affecting the client or the server that sends or receives the protocols.

In a preferred embodiment of the invention, a plumbing approach is used wherein a "pipe" (producer) is created to interpret a specified push protocol. Push Universal Resource Locators (PURLs) (the streams) are delivered from a server across the computer network to each pipe that handles the specific protocol. The pipe interprets the protocol and delivers the stream to the subscribing client (consumer).

Several pipes can be combined and clients can subscribe to several different protocols. These pipes are capable of delivering streams to multiple clients. Pipes are created dynamically as each client subscribes to different protocols.

Filters are easily added and removed dynamically to or from the system to filter streams. A filter can be added to the output side of a pipe before distribution to the clients. Additionally, a filter can be added before the client to filter the incoming stream. This allows for a flexible system with multiple filtering schemes.

Other aspects and advantages of the invention will become apparent from the following detailed description in combination with the accompanying drawings, illustrating, by way of example, the principles of the invention.

DETAILED DESCRIPTION OF THE INVENTION

Figure 1:
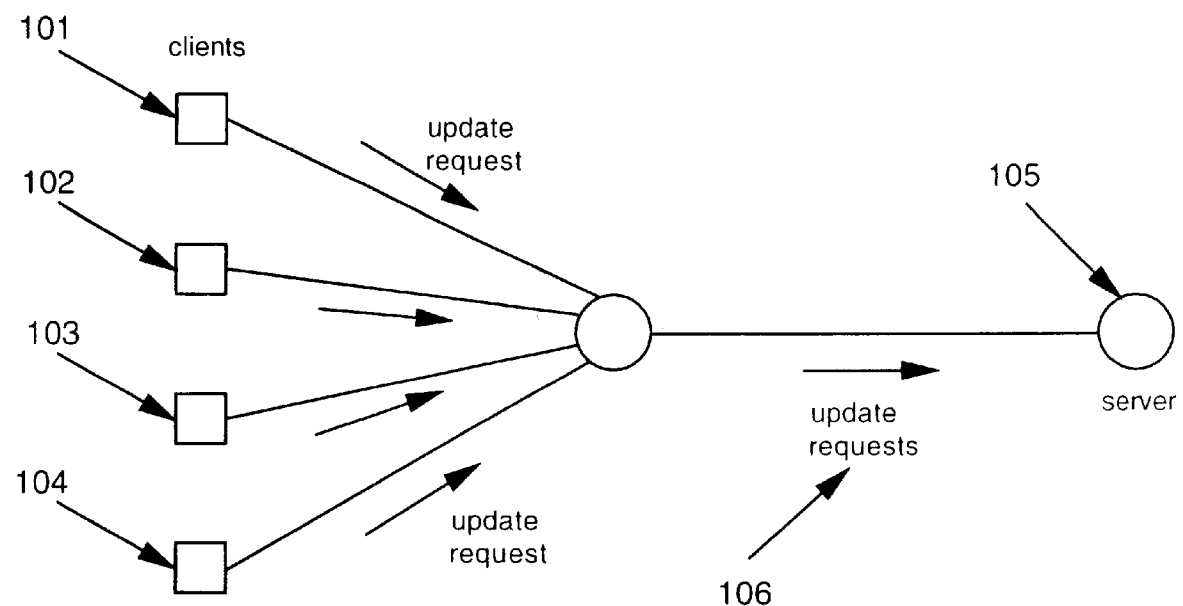
FIG. 1 is a block schematic diagram of a client-initiated push technology scenario.
Figure 2:
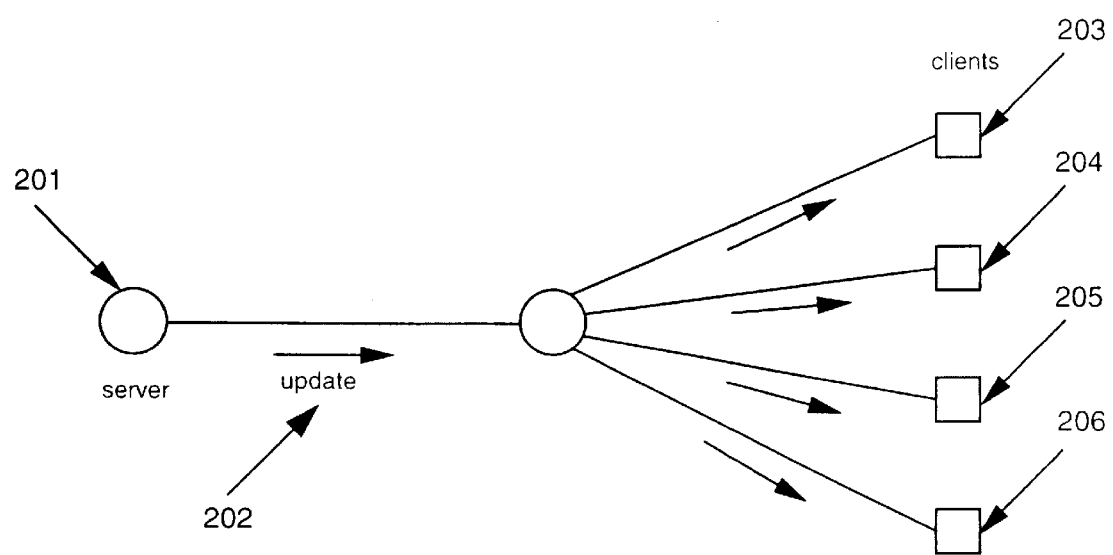
FIG. 2 is a block schematic diagram of a true push technology example.

As shown in the drawings for purposes of illustration, the invention is embodied in a unifying push framework system for client/server applications. A system according to the invention provides an easily configurable multi-protocol push framework that interprets and distributes different protocols in a computer network, thereby allowing the user to select any combination of push protocols at any time. The existing solutions provide little or no control over dynamic changes in protocol selection.

A wide variety of protocols exist in push technology, yet there is insufficient experience to know for certain which of the protocols is best for which applications. It is desirable to provide a unifying framework that enables the construction of applications independent of the underlying push protocols.

The invention can be used for any type of pushed application. For example, notification can be accommodated by using the mid: Universal Resource Locator (URL) scheme which is used for message IDs assigned to mail and other messages. A plumbing system approach is used in the preferred embodiment of the invention. The push stream approach herein does not impose any limitation on which URLs may be passed through the system, making the invention much more dynamic than existing systems. The invention separates push URLs from pull URLs, which prevents certain types of design errors by making it impossible to commingle the two.

Figure 3:
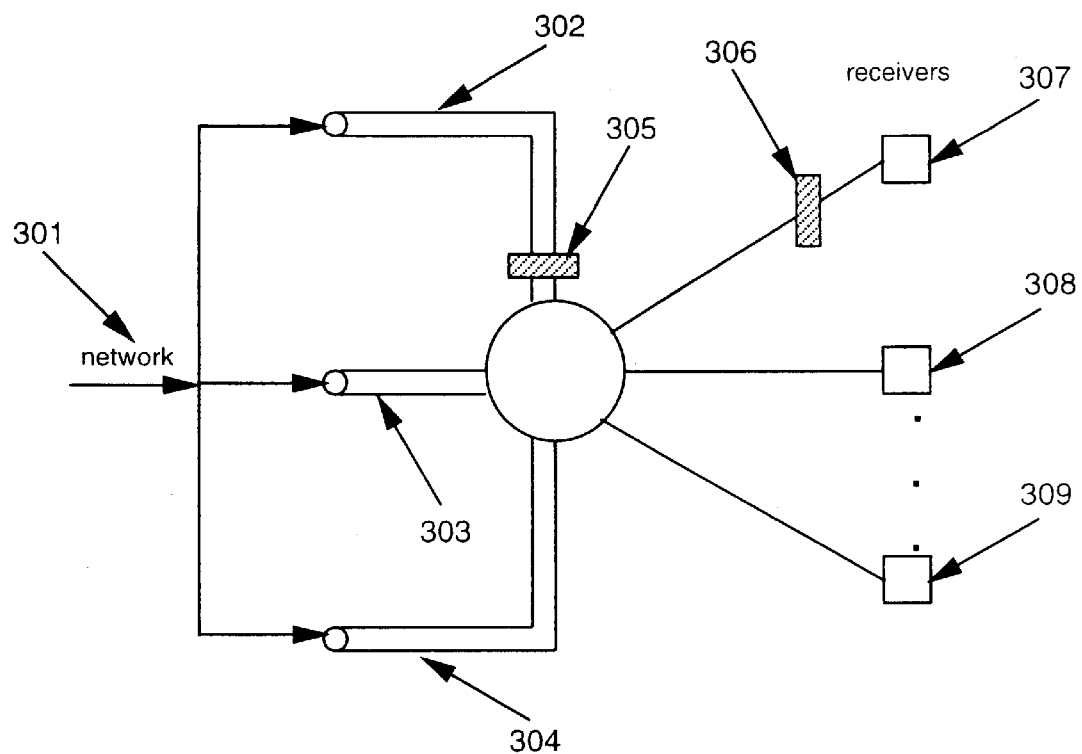
FIG. 3 is a block schematic diagram of the plumbing approach used in a preferred embodiment of the invention.

The push framework simplifies the process of building the server and client applications that send or receive pushes. Every time information is pushed, the transaction is modeled as an event. With respect to FIG. 3, the framework allows the user to create a "plumbing" piece 302 that is assembled with other pieces 303, and 304. A plumbing piece 302 is a source, the piece that receives the events from the network 301 and passes them down to a receiver 307. A plumbing piece 301 takes in an event from the network 301 and replicates it across to n receivers 307, 308, and 309. A filter 305 can be added to a plumbing piece 302 that filters according to a particular filter strategy. A filter 306 can also be added before a receiver 307.

A plumbing piece can also receive data, put it in the browser's cache, and notify the browser that the content that it is currently viewing has changed.

The user can also build a framework for an application that performs notification. The notification feature receives a message which appears immediately on the screen. The invention can also be used for channel push or anything else that depends on getting a stream of messages to someone, either the user, cache, or program that is going to be using the stream, e.g. the framework could deliver stock market information intended for analysis.

Figure 4:
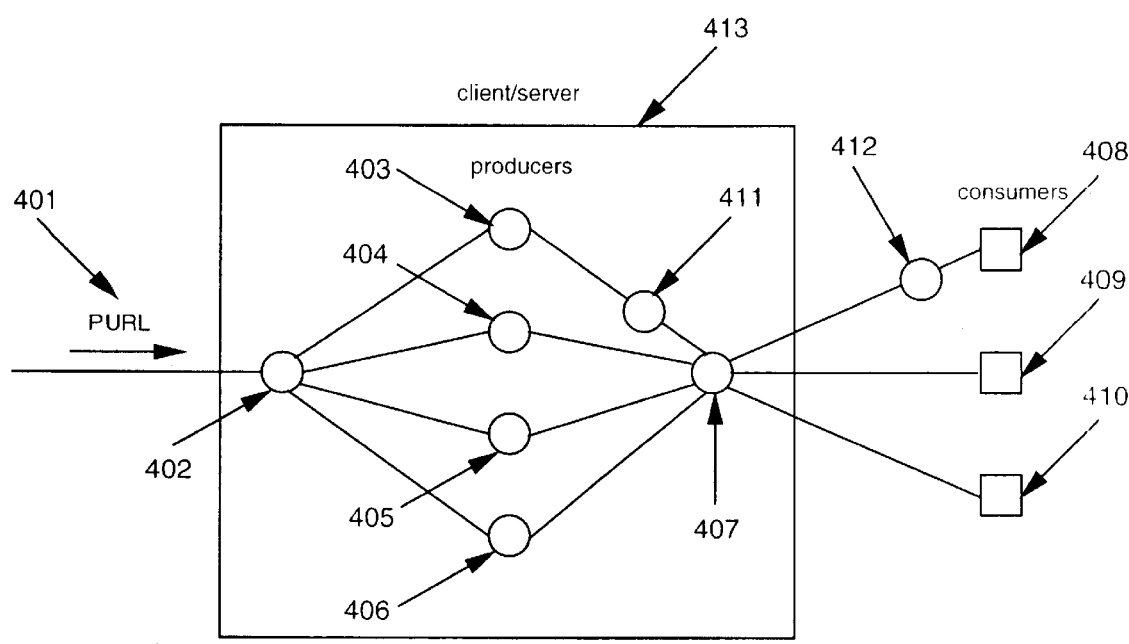
FIG. 4 is a block schematic diagram of a Push Universal Resource Locator (PURL) stream flow through a preferred embodiment of the invention.

Referring to FIG. 4, a Push URL (PURL) (the stream) 401 is passed to the producer infrastructure 402. The producer infrastructure 402 selects and creates the correct pipe (producer) 403, 404, 405, or 406 to deliver the PURL. Producers are created dynamically as each consumer subscribes to different protocols. The producers 403, 404, 405, and 406 interpret the protocol and deliver the stream to the network. The actual distribution to the consumers 408, 409, and 410 is handled by the consumer infrastructure 407 that knows which consumers have subscribed to the particular producer's stream. This functionality is contained within the client or server 413 receiving the PURL. Filters may be dynamically added or removed after the producer output 411 or before the consumer input 412 to filter the incoming stream.

Figure 5:
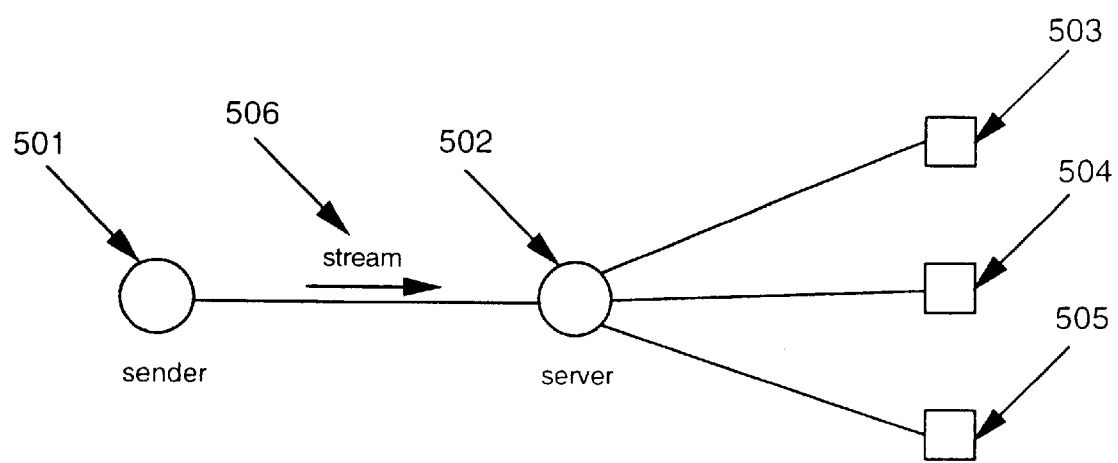
FIG. 5 is a block schematic diagram of a multicast example of a preferred embodiment of the invention.

Referring to FIG. 5, the invention allows for more efficiency. In this example, there are three applications 503, 504, and 505 that want to listen to a stream 506, the sender 501 only has to talk to the server 502 once and have the stream forked out to the three applications 503, 504, and 505 at once. Thus, the applications request a subscription to the feed and the data is automatically delivered.

The invention allows the user to transform or save the stream as it moves through the system without interfering with the consumers or producers of the stream.

The following is an example of a general description for a preferred embodiment of the invention:

Push Framework Programmers Guide

Introduction

The Push Framework is a Java Application Programming Interface (API) for building applications that use true push technology (i.e., where the server sends pages as they change, rather than having the client poll the pages regularly). The framework is designed to make it easy to plug in new push protocols without updating client applications. It will be appreciated that it is not necessary to use the Java API. Rather, those skilled in the art will appreciate that other API's may be used to implement the invention.

The Concepts

Push Streams and PURLs

At the heart of the API is the concept of a push stream, a sequence of pages (or other items of Web content) which flows from the server to the client. A push stream coming from the network is identified by a PURL, i.e. a Push URL.

Producers and Consumers

In the API, pages flow from Producers to Consumers; the simplest case is a Producer which receives pages from the network and a Consumer which displays them. It is also possible to construct more complicated pipelines through the API, by connecting Producers and Consumers together with intermediate classes, in a manner similar to Unix command-line filters.

Commands

Conceptually, what flows from a Producer to a Consumer is not a Web page, per se, but a Command, an object which controls the Consumer based on the incoming messages from the server. The Command uses the Consumer's operations to implement the semantics of the message the Command represents. For example, a message meaning "Here's a Web page" would result in an EntityPutCommand, which is constructed with the incoming Web page, and whose _apply( ) method invokes the Consumers pushStore( ) method to give the Consumer the new page. More complex Commands can be constructed to meet the needs of individual push protocols; for example, a push protocol that sends only the differences when a page changes could define an EntityDiffCommand.

The main advantage of passing Commands around, instead of having a Producer invoke a Consumer's methods directly is that it turns protocol operations into first-order entities in the API. For example, a Command can be a grouping of simpler Commands, enabling a Consumer to treat them as a unit. This allows a protocol to group a set of changes together, to be applied together, so that the application does not attempt to reflect any of the changes until it has reached a consistent state.

The Classes

The Classes are set forth in detail in Appendix A attached hereto.

Producers

The Producer interface and related classes.

Producer

Producer is an interface representing a source of Web pages. A Producer must implement three methods:

setConsumer(Consumer)

setConsumer( ) tells the Producer to which Consumer to pass the Commands for its stream. Note that any given Producer passes Commands to exactly one Consumer. If it is necessary to pass a stream to multiple Consumers, create a CompositeConsumer which contains the Consumers to receive the stream.

For most Producers, setConsumer( ) is simply a matter of setting an instance variable.

pushIncludes(PURL)

pushIncludes( ) asks the Producer whether the stream it is producing includes the stream indicated by the given PURL. This enables a client to avoid subscribing to two overlapping streams.

Most PURL protocols may not have syntax that can specify streams that are subsets of each other, in which case pushIncludes( ) simply returns false.

close( )

Closes down the Producer—e.g. close network sockets, null out any instance variables (to prevent memory leaks).

ProducerFilterDecorator

A Decorator (a class that adds additional functionality to an underlying object) applies a FilterStrategy to filter the output of a Producer. A ProducerFilterDecorator is itself a Producer, and can be used with a Consumer as normal. Its constructor takes the underlying Producer and the FilterStrategy to apply; after that, no further user intervention is needed.

CompositeProducer

This is a Producer that aggregates multiple producers into one, so that a Consumer can subscribe to multiple streams. It implements the Producer interface and also two new methods, addProducer( ) and delProducer( ), to maintain the list of producers from which the Consumer is receiving information.

Subscription Manager

This is a CompositeProducer that lets a Consumer add and remove Producers by PURL instead of having to create them directly and then add them to the composite. It adds two new methods, subscribe( ) and unsubscribe( ), each of which takes a PURL. This is probably the class of most interest to application developers.

ProducerFactory

This is an abstract class for constructing Producers. A ProducerFactory must implement two methods: getPurlProtocol( ) and makeProducer( ). getPurlProtocol returns a String, the name of the PURL protocol being implemented. makeProducer( ) takes a PURL (whose protocol is guaranteed to match getPurlProtocol( )) and constructs a Producer.

ProducerFactory also implements three important methods:

register( ), which adds the factory to a static table of known factories for PURL protocols;

unregister( ), which removes it from the table;

and the static method newProducer( ), which takes a PURL, finds its protocol, and asks the correct registered factory to create a Producer. register( ) and unregister( ) are called by protocol developers. NewProducer( ) is called by applications needing Producers for their PURLs (or by SubscriptionManager).

Consumers

This is the Consumer interface and various classes that implement it.

Consumer

Consumer is an interface representing a receiver of Web pages. It must implement:

pushExecute(EntityChangeCommand)

Causes the Consumer to execute the given Command. The usual implementation is {command.apply(this);}—i.e., simply let the Command do as it will—but more flexibility is possible. For example, ConsumerFilterDecoration decides whether the Command should pass through the filter before invoking apply( ).

pushStore(HTTPEntity)

Handles an incoming HTTPEntity (Web content item). Actually gets queued up; see pushRefresh( ), below.

pushDel(URL)

Deletes the specified entity from the Consumer's cache, if any. Actually gets queued up; see pushRefresh( ), below.

pushFetch(URL)

Retrieves the specified entity from the Consumer's cache, if any. Needed to support protocols that use diffs.

pushRefresh( )

Takes all the changes (stores and deletes) that have occurred since the last pushRefresh( ) and performs them. Necessary to let the application always display an internally consistent view of the content.

CompositeConsumer

This is a Consumer that aggregates multiple Consumers into one, so that a Producer's stream can be provided to multiple Consumers. It implements the Consumer interface and also two new methods, addConsumer( ) and delConsumer( ), to maintain the list of Consumers receiving the stream.

ConsumerFilterDecorator

This is a Decorator (a class that adds additional functionality to an underlying object) which applies a FilterStrategy to filter the stream being given to a Consumer. A ConsumerFilterDecorator is itself a Consumer, and can be used with a Producer as normal. Its constructor takes the underlying Consumer and the FilterStrategy to apply; after that, no further user intervention is needed.

Filters

Classes used for filtering push streams.

FilterStrategy

This is an abstract class that represents a filter to apply to a stream. Used in ConsumerFilterDecorator and ProducerFilterDecorator. To implement a FilterStrategy, it is necessary to implement the interested method; there are three forms, but it is acceptable, as a minimal implementation, to implement only interested (URL).

SrcFilterStrategy

THIS IS A FilterStrategy that lets any entity through as long as its URL starts with a prefix specified in the filter's constructor.

MimeTypeFilterStrategy

THIS IS A FilterStrategy that lets any entity through as long as it is of a MIME type specified in the filter's constructor. The constructor also specifies a Boolean, "strict"; if it is not true, objects of unknown type are also allowed through.

AndFilterStrategy

THIS IS A composite FilterStrategy that lets an entity through if, and only if, it passes through all of the member filters.

OrFilterStrategy

THIS IS A composite FilterStrategy that lets an entity through if, and only if, it passes through at least one of the member filters.

NotFilterStrategy

THIS IS A Decorator FilterStrategy that lets an entity through if, and only if, it does not pass through the underlying filter.

Commands

These are classes passed from Producers to Consumers. Note that an application developer probably does not need to worry about the details of these classes; but just implements the Consumer methods, and the Commands invoke the methods properly. These details are most important for a protocol developer; even then, most protocols can get by with just EntityPutCommand and maybe EntityDelCommand.

EntityChangeCommand

This is an abstract class representing a change to be applied to a Consumer's view of the world; to put it another way, a message from a push server.

An EntityChangeCommand may have a parent (set at construction time), indicating that it is part of a batch of commands; the apply( ) method uses this to decide whether to invoke the Consumer's pushRefresh( ) method after calling _apply( ). Only Commands without parents trigger pushRefresh( ). This means that the Consumer treats a batch of commands as a unit.

Someone implementing a new subclass of EntityChangeCommand (probably, only protocol developers) needs to implement _apply( ) and isStrategyInterested( ). _apply( ) takes a Consumer and uses its methods to carry out the change which the Command represents; isStrategyInterested takes a FilterStrategy and invokes the appropriate interested( ) method(s) to find out whether the filter is interested in the Command's contents.

EntityPutCommand

The EntityPutCommand is an EntityChangeCommand which is constructed with an HTTPEntity. It indicates that the entity has been received from the network. Its _apply( ) invokes the Consumer's pushStore( ) method; its isStrategyInterested( ) invokes the FilterStrategy's interested(HTTPEntity) method.

EntityDelCommand

The EntityDelCommand is an EntityChangeCommand which is constructed with a URL. It indicates that the entity at that URL is no longer valid. Its _apply( ) invokes the Consumer's pushDel( ) method; its isStrategyInterested( ) invokes the FilterStrategy's interested(URL) method.

EntityBatchCommand

The EntityBatchCommand is a composite EntityChangeCommand, a Command that represents a batch of Commands which must be treated as a group. It adds a single method to EntityChangeCommand, addCommand( ), which adds a new Command to the composite.

Basic Vocabulary

The classes which the other classes route around.

PURL

This is an object representing a push URL, constructed from a String. It provides methods for accessing its fields: protocol, hostname, port, and path.

HTTPEntity

This is an object representing a piece of Web content; e.g. a page or an image. It is constructed either blank or from an array of bytes. If it is constructed blank, headers and data may be added via the setHeader( ) and setData( ) methods; if it is constructed from bytes, they should be formatted with headers and data, like an RFC-822 message (or an HTTP response without the status line). The HTTPEntity provides methods to access these header fields and data.

An HTTPEntity is normally created by a Producer implementing a protocol, when the push server sends an object of Web content. The HTTPEntity must provide a Content-Location:, so that the receiver knows where to cache the entity.

Figure 6:
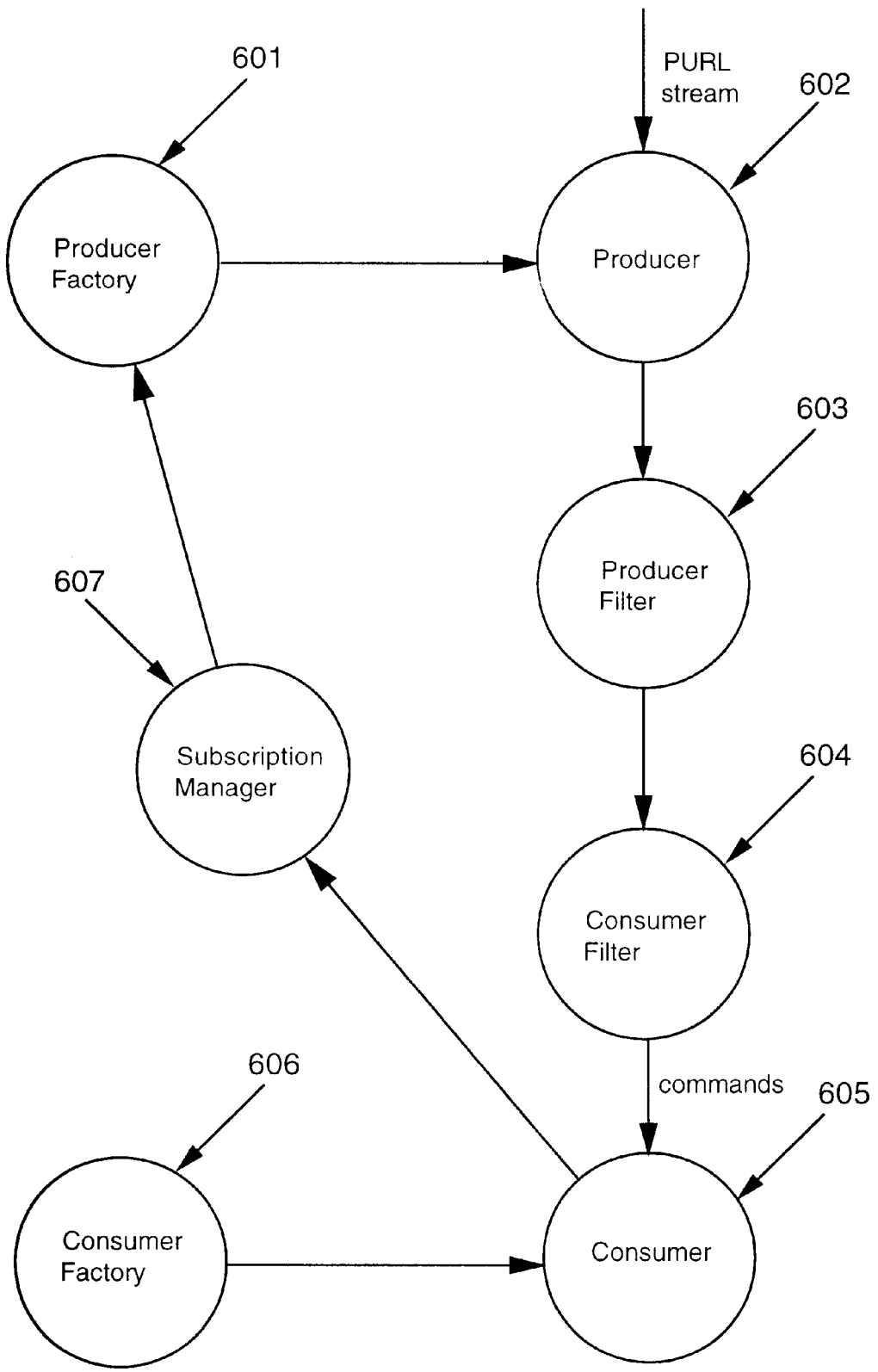
FIG. 6 is a block schematic diagram of a task-oriented view of a preferred embodiment of the invention.

Referring to FIG. 6, the producer factory 601 creates producers 602. The producer factory 601 finds the PURL protocol type and constructs a producer that handles the specific PURL protocol.

The consumer factory 606 creates consumers 605. A consumer 605 receives Web pages and executes commands from the PURL stream, updating the page content to reflect the commands. Consumers 605 use the subscription manager 607 to subscribe and unsubscribe to producers 602 for specific PURLs. The subscription manager 607 requests producers 602 from the producer factory 601.

The producers 602 that are created for each subscription pass the commands for its type of stream to a specified consumer 605. Consumers 605 can subscribe to multiple producers through a type of producer 602 called a composite producer which sends multiple streams to a specific consumer 605. A composite consumer can also be created in the same manner through the consumer factory 606 that allows a stream from a producer 602 to be provided to multiple consumers.

A producer filter 603 is optionally added to filter the output stream from a producer 602. A consumer filter 604 is also available to filter streams coming into a consumer 605. Filters, for example, can sort by URL prefix or Multipurpose Internet Mail Extensions (MIME) type. Multiple filters can be grouped together to provide boolean logic filters.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A process for unifying push protocols in a computer network environment, comprising the steps of:
   accepting a Push Universal Resource Locator (PURL) stream from said network;
   dynamically creating a producer for a specified push protocol, wherein said producer is specifically adapted to accept and process a PURL information stream formatted in said specified push protocol and to output a processed information stream;
   directing said PURL stream to the proper producer; and
   distributing said processed information stream to the proper consumer.

2. The process of claim 1, further comprising the step of:
   subscribing said consumer to a specified push protocol.

3. The process of claim 2, wherein said subscribing step allows a consumer to subscribe to more than one specified push protocol.

4. The process of claim 2, wherein said subscribing step allows a consumer to unsubscribe to a specified push protocol.

5. The process of claim 1, wherein said distributing step distributes said processed information stream to a plurality of consumers.

6. The process of claim 1, further comprising the step of:
   dynamically adding or removing a filter to or from the output side of said producer, wherein said filter acts upon said processed information stream and outputs a filtered information stream in place of said processed information stream.

7. The process of claim 1, further comprising the step of:
   dynamically adding or removing a filter to or from the input side of a consumer, wherein said filter acts upon said input information stream provided to said consumer and outputs a filtered information stream to said consumer.

8. The process of claim 1, further comprising the step of:
   dynamically adding or removing a boolean logic filter to or from the output side of a producer.

9. The process of claim 1, further comprising the step of:
   dynamically adding or removing a boolean logic filter to or from the input side of a consumer.

10. The process of claim 1, further comprising the step of:
    creating a filter that filters said processed stream by URL prefix.

11. The process of claim 1, further comprising the step of:
    creating a filter that filters said processed stream by Multipurpose Internet Mail Extensions (MIME) type.

12. An apparatus for unifying push protocols in a computer network environment, comprising:
    a module for accepting a Push Universal Resource Locator (PURL) stream from said network;
    a module for dynamically creating a producer for a specified push protocol, wherein said producer is specifically adapted to accept and process a PURL information stream formatted in said specified push protocol and to output a processed information stream;

a module for directing said PURL stream to the proper producer; and a module for distributing said processed information stream to the proper consumer.

13. The apparatus of claim 12, further comprising:

a module for subscribing said consumer to a specified push protocol.

14. The apparatus of claim 13, wherein said subscribing module allows a consumer to subscribe to more than one specified push protocol.

15. The apparatus of claim 13, wherein said subscribing module allows a consumer to unsubscribe to a specified push protocol.

16. The apparatus of claim 12, wherein said distributing module distributes said processed information stream to a plurality of consumers.

17. The apparatus of claim 12, further comprising:

a module for dynamically adding or removing a filter to or from the output side of said producer, wherein said filter acts upon said processed information stream and outputs a filtered information stream in place of said processed information stream.

18. The apparatus of claim 13, further comprising:

a module for dynamically adding or removing a filter to or from the input side of said consumer, wherein said filter acts upon said input information stream provided to said consumer and outputs a filtered information stream to said consumer.

19. The apparatus of claim 12, further comprising:

a module for dynamically adding or removing a boolean logic filter to or from the output side of a producer.

20. The apparatus of claim 12, further comprising:

a module for dynamically adding or removing a boolean logic filter to or from the input side of a consumer.

21. The apparatus of claim 1, further comprising:

a module for creating a filter that filters said processed stream by URL prefix.

22. The apparatus of claim 1, further comprising:

a module for creating a filter that filters said processed stream by Multipurpose Internet Mail Extensions (MIME) type.

* * * * *